US010917454B1

(12) United States Patent
Slavik (10) Patent No.: US 10,917,454 B1
(45) Date of Patent: Feb. 9, 2021

(54) SYSTEM AND METHOD FOR ATC VOICE QUALITY ASSURANCE (71) Applicant: Rohde & Schwarz GmbH & Co. KG, Munich (DE)

(72) Inventor: Jindrich Slavik, Freising (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/529,358

(22) Filed: Aug. 1, 2019

(51) Int. Cl.
*H04L 29/06* (2006.01)
*G08G 5/00* (2006.01)
*G10L 25/60* (2013.01)
*H04L 12/26* (2006.01)
*H04L 12/24* (2006.01)

(52) U.S. Cl.
CPC .......... *H04L 65/80* (2013.01); *G08G 5/0095* (2013.01); *G10L 25/60* (2013.01); *H04L 41/0631* (2013.01); *H04L 41/0654* (2013.01); *H04L 43/067* (2013.01); *H04L 43/12* (2013.01); *H04L 43/087* (2013.01); *H04L 43/0829* (2013.01); *H04L 43/0864* (2013.01)

(58) Field of Classification Search
CPC . H04L 65/80; H04L 41/0631; H04L 41/0654; H04L 43/067; H04L 43/12; H04L 43/0829; H04L 43/0864; H04L 43/087; H04L 43/02; H04L 43/04; H04L 43/045; H04L 43/06; H04L 43/062; H04L 43/065; H04L 43/08; H04L 43/0805; H04L 43/0811; H04L 43/0817; H04L 43/0823; H04L 43/0835; H04L 43/0841; H04L 43/0847; H04L 43/0852; H04L 43/0858; H04L 43/0876; H04L 43/0882; H04L 43/0888; H04L 43/0894; H04L 43/10; H04L 43/103; H04L 43/106; H04L 43/14; H04L 3/16; H04L 43/18; H04L 43/50; G08G 5/0095; G10L 25/60
See application file for complete search history.

(56) References Cited

U.S. PATENT DOCUMENTS

| 5,999,525 | A | 12/1999 | Krishnawamy et al. |
| 6,909,708 | B1 | 6/2005 | Krishnawamy et al. |
| 6,965,816 | B2 | 11/2005 | Walker |
| 9,281,890 | B2 | 3/2016 | Apostolakos et al. |
| 2010/0103831 | A1* | 4/2010 | Caldwell ............... H04W 48/06 370/252 |
| 2013/0329595 | A1* | 12/2013 | Scholz .................... H04L 65/80 370/252 |

(Continued)

FOREIGN PATENT DOCUMENTS

| BR | 9205969 A | 7/1994 |
| BR | 9714315 A2 | 2/2000 |
| BR | 9808592 A | 7/2001 |

(Continued)

*Primary Examiner* — Hardikkumar D Patel
(74) *Attorney, Agent, or Firm* — Ditthavong & Steiner P. C.

(57) ABSTRACT

A voice quality measuring system is provided. The voice quality measuring system comprises a radio site, an air traffic control center, ACC, an internet protocol, IP, based communications system, connecting the radio site and the ACC, and at least one IP probe. The IP probe is configured to monitor IP traffic between the radio site and the ACC through the IP based communications system.

16 Claims, 6 Drawing Sheets

(56) References Cited

U.S. PATENT DOCUMENTS

2020/0193841 A1* 6/2020 D'Alto ................ G08G 5/0091

FOREIGN PATENT DOCUMENTS

| | | |
|---|---|---|
| BR | 9809561 A2 | 9/2001 |
| CA | 2240737 C | 9/2009 |
| CA | 2103248 C | 10/2010 |
| CA | 2711968 C | 8/2016 |
| CA | 2774349 C | 3/2019 |
| EP | 0137280 A1 | 4/1985 |
| EP | 1 333 093 A3 | 9/2008 |
| JP | 3091769 B2 | 10/1996 |
| JP | 2584186 B2 | 2/1997 |
| JP | 2001190289 A | 7/2001 |
| JP | 2001520768 A | 10/2001 |
| JP | 2002348255 A | 12/2002 |
| JP | 3826055 B2 | 9/2006 |
| JP | 2019071276 A | 5/2019 |
| KR | 20180127523 A | 11/2018 |
| WO | 9219739 A1 | 11/1992 |
| WO | 9519993 A1 | 7/1995 |
| WO | 9618965 A1 | 6/1996 |
| WO | 9847298 A2 | 10/1998 |
| WO | 2011116236 A2 | 9/2011 |
| WO | 2012138576 A1 | 10/2012 |

* cited by examiner

SYSTEM AND METHOD FOR ATC VOICE QUALITY ASSURANCE

TECHNICAL FIELD

The invention relates to monitoring IP based communications connections in air traffic control.

BACKGROUND ART

ATC communication used to be handled exclusively through analog radio frequency communications channels. There is a trend though to replace this type of ATC communication by digital internet protocol, IP, based communications systems in the tower environment. In such communications systems, the monitoring of the connection quality is a problem yet unsolved.

For example, the document U.S. Pat. No. 9,281,890 B2 shows an IP based air traffic control communications system.

Accordingly, there is a need to provide a system and method for high quality ATC communication, which allows a simple voice quality measuring.

SUMMARY OF THE INVENTION

According to a first aspect of the invention, a voice quality measuring system is provided. The voice quality measuring system comprises a radio site, an air traffic control center, ACC, an internet protocol, IP, based communications system, connecting the radio site and the ACC, and at least one IP probe. The IP probe is configured to monitor IP traffic between the radio site and the ACC through the IP based communications system. This allows for a high-quality communications connection, which can easily be monitored.

Advantageously, the radio site is located in a control tower. The radio site comprises at least one radio. This allows for an application of the voice quality measuring system to communications connections to a control tower.

Preferably, the ACC comprises at least one air traffic control, ATC, working place. This allows for an application of the voice quality measuring system to communications connections to air traffic control working places.

Advantageously, the at least one probe is located within the IP based communications system or at one point of the IP based communications system. This allows for an especially accurate monitoring of the IP traffic.

Preferably, the IP based communications system comprises at least one air traffic navigation service provider wide area network, ANSP WAN, connection. This allows for monitoring the IP traffic through ANSP WAN connection.

Advantageously, the at least one IP probe is configured to monitor IP traffic over the at least one ANSP WAN connection. An especially simple implementation can thereby be reached.

Advantageously, the IP based communications system comprises a plurality of interlinked communications devices. In this case, the voice quality measuring system comprises a plurality of IP probes, each configured to monitor IP traffic at one of the plurality of the interlinked communications devices of the IP based communications system. This allows for a determining of an origin of a fault within the IP based communications system.

Preferably, the voice quality measuring system comprises a traffic analyzer, which is configured to analyze the IP traffic monitored by the at least one IP probe. This allows for a very simple usage.

Advantageously, the traffic analyzer comprises a parameter determiner, configured to determine at least one parameter of the IP traffic monitored by the IP probe. This allows for a low necessary skill of the operator.

Advantageously, the parameter determiner is configured to determine the at least one parameter in time slices of a predetermined time duration. This allows for an especially accurate determining of the parameters.

Preferably, the parameter determiner is configured to determine a voice quality indicator, especially a mean opinion score, MOS, based on the monitored IP traffic, and/or a jitter value, and/or a round trip delay value, and/or a packet arrival time histogram, and/or a packet loss rate, and/or a burst loss rate, and/or a loss density, and/or a transport policy. This allows for a very flexible monitoring.

Advantageously, the traffic analyzer comprises a fault determiner, configured to automatically determine faults of the IP based communications system and/or the radio site and/or the ACC, based upon the at least one parameter of the IP traffic determined by the parameter determiner. This allows for a very simple automatic operation of the system.

Preferably, the fault determiner is configured to automatically determine the faults of the IP based communications system based upon detecting pre-defined patterns of the at least one parameter of the IP traffic determined by the parameter determiner. This allows for an especially low necessary user experience.

Preferably, the parameter determiner is configured to determine a packet loss rate and a jitter value. The fault determiner is then configured to automatically determine a broken fiber fault of the IP based communications system based upon detecting an increased packet loss rate and a nominal jitter value. This allows for an especially simple automatic detection of a broken fiber fault.

Advantageously, the voice quality measuring system additionally comprises an airplane, a further internet protocol, IP, based communications system, connecting the radio site and the airplane, and at least one further IP probe. The radio site therein is a next generation radio site, NGRS. The further IP probe is configured to monitor IP traffic between the radio site and the airplane through the further IP based communications system. This allows for a monitoring of the quality not only of the communications between the ACC and the radio site, but also between the radio site and the airplane.

Preferably, the further IP probe is located on the airplane. This allows for an especially short delay for an airplane-based operator to judge the connection quality.

According to a second aspect of the invention, a communications system comprising a previously shown voice quality measuring system and an amplitude modulation, AM, based communications system, connecting the radio site and the airplane and/or connecting the ACC and the radio site. If IP traffic monitored by the IP probe and/or IP traffic monitored by the further IP probe has a quality parameter value below a quality threshold, the communications system is adapted to cease communication by the IP based communications system and/or the further IP based communications system, and begin communication by the AM based communications system. This allows for an especially safe communication, since in case of a too low connection quality via the IP based communications systems, a fallback to tried and true AM based communications is possible.

According to a third aspect of the invention, a voice quality measuring method is provided. The inventive method comprises connecting a radio site to an internet protocol, IP, based communications system, connecting an air traffic control center, ACC, to the IP based communications system, connecting at least one IP probe to the IP based communications system, and monitoring IP traffic between the radio site and the ACC through the IP based communications system by the IP probe. This allows for a high-quality communications connection, which can easily be monitored.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
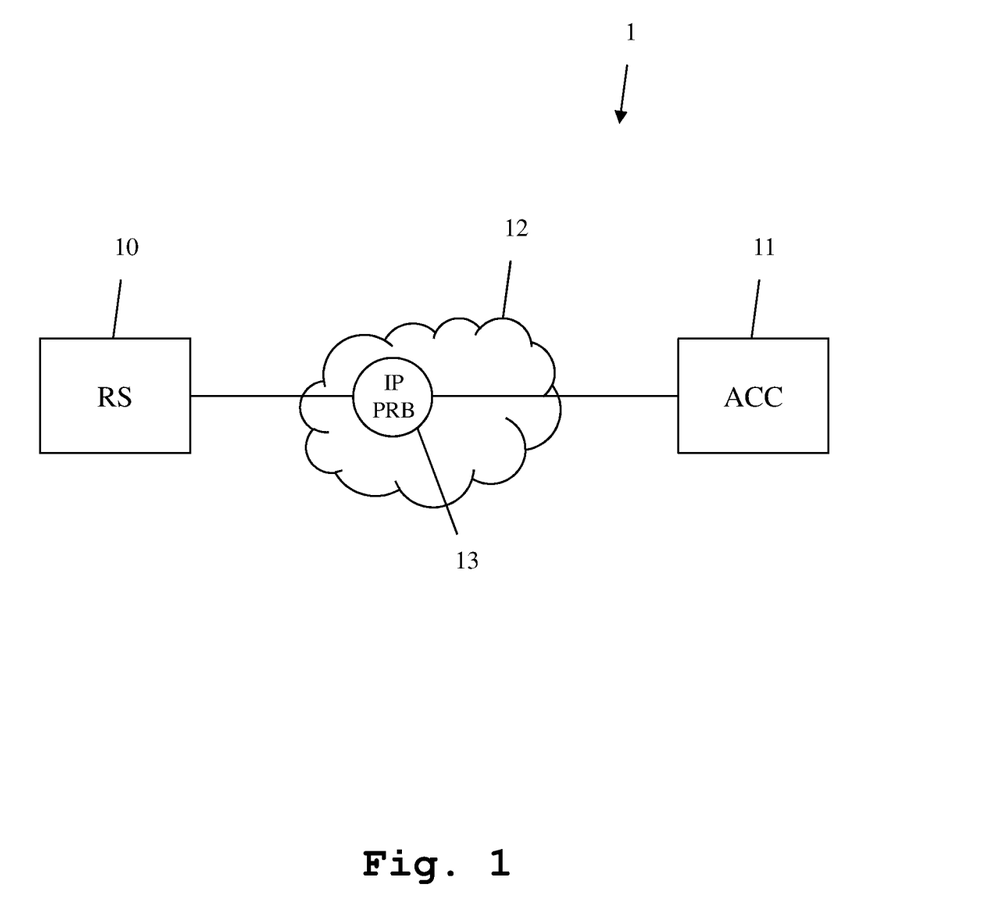
FIG. 1 shows a first embodiment of the first aspect of the invention.

First, we demonstrate the general construction and function of an embodiment of the first aspect of the invention along FIG. 1. Details with regard to construction and function of different embodiments are shown and described along FIG. 2-FIG. 4. Along FIG. 5, the construction and function of a second aspect of the invention is described. Finally, the detailed function of an embodiment of the second aspect of the invention is described along FIG. 6. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the voice quality measuring system according to the first aspect of the invention is shown. The voice quality measuring system 1 comprises a radio site 10 and an air traffic control center, ACC, 11, both connected through an internet protocol, IP, based communications system 12. The voice quality measuring system moreover comprises an internet protocol, IP, probe 13, which is connected to the IP based communications system 12.

The radio site 10 preferably is located in a control tower and comprises at least one radio.

The ACC advantageously comprises at least one air traffic control, ATC, working place.

Preferably, the IP based communications system is or at least comprises an air traffic navigation service provider wide area network, ANSP WAN, connection.

Advantageously, the traffic is transmitted within the IP based communications system 12 optically or cable based.

The IP probe 13 is drawn as a separate entity in FIG. 1 with regard to the IP based communications system 12. In practice though, the IP probe 13 can be part of the IP based communications system 12 or can be located at a specific location within the IP based communications system 12.

The radio site 10 and the ACC 11 communicate with each other using internet protocol-based communications by way of the IP based communications system 12. The IP probe 13 monitors this IP based communication. It is important to note that the traffic runs through the IP probe 13.

Especially, the IP probe 13 monitors IP traffic between the radio site 10 and the ACC 11 through the IP based communications system. Based upon this monitored IP traffic, the voice quality can be determined.

Second Embodiment

Figure 2:
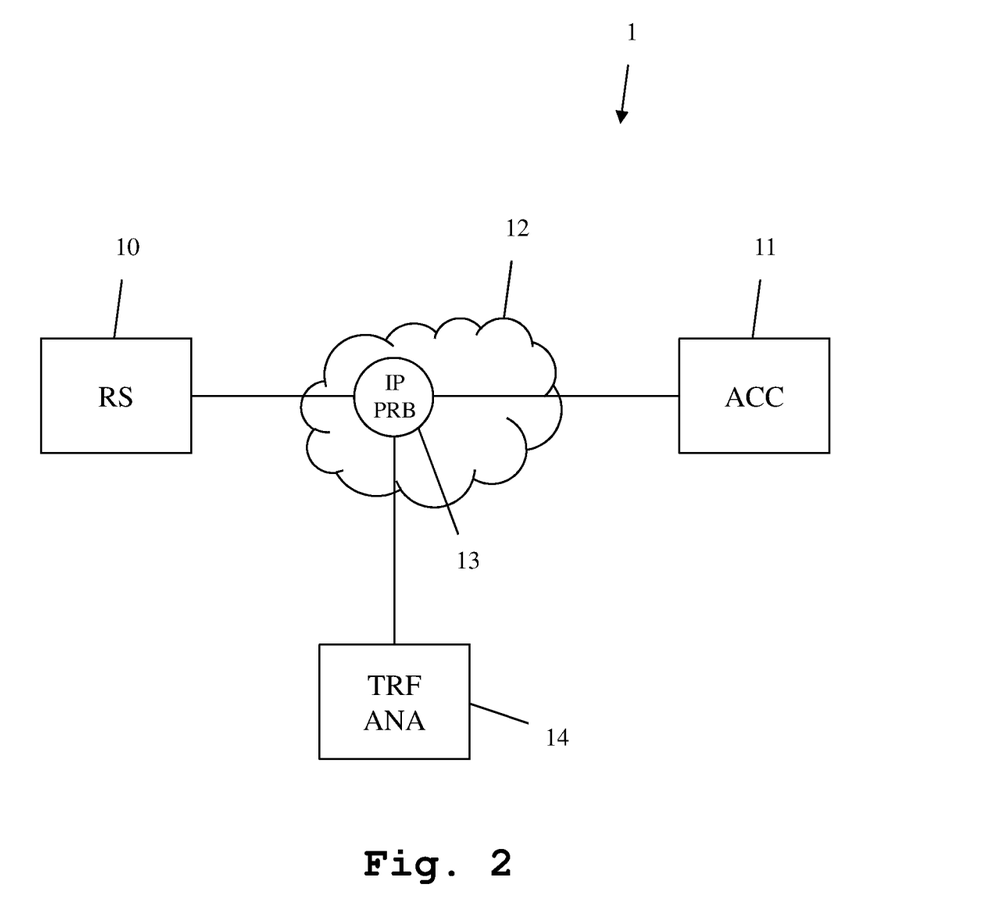
FIG. 2 shows a second embodiment of the first aspect of the invention.

In FIG. 2, a second embodiment of the voice quality measuring system according to the first aspect of the invention is shown. Here, the voice quality measuring system 1 additionally comprises a traffic analyzer 14, connected to the IP probe 13. This traffic analyzer 14 is configured to analyze the IP traffic monitored by the at least one IP probe 13. Especially, the traffic analyzer 14 is adapted to determine the voice quality based upon the monitored IP traffic.

Third Embodiment

Figure 3:
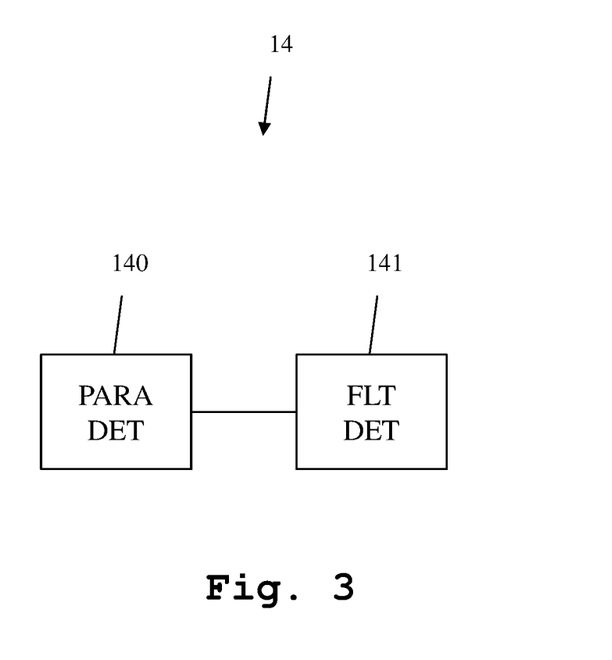
FIG. 3 shows a detail of a third embodiment of the first aspect of the invention.

In FIG. 3, a detail of a third embodiment of the voice quality measuring system 1 according to the first aspect of the invention is shown. Here, the inner workings of the traffic analyzer 14 are shown. The traffic analyzer 14 here comprises a parameter determiner 140 connected to a fault determiner 141.

The monitored IP traffic is handed to the parameter determiner 140 by the IP probe 13. The parameter determiner 140 then determines at least one parameter of the IP traffic monitored by the IP probe 13. Also, more than one parameter can be determined. Especially, the at least one parameter is advantageously determined by the parameter determiner 140 in time slices of a predetermined time duration.

The parameters, which can for example be determined by the parameter determiner 140 are:
  a voice quality indicator, especially a mean opinion score,
    MOS, based on the monitored IP traffic, and/or
  a jitter value, and/or
  a round trip delay time, and/or
  a packet arrival time histogram, and/or
  a packet loss rate, and/or
  a burst loss rate, and/or
  a loss density, and/or
  a transport policy.

The at least one determined parameter is then handed on to the fault determiner 141, which is configured to detect patterns within the at least one parameter and therefrom deduce faults within the IP based communications system and/or the radio site and/or the ACC.

For example, the fault determiner 141 can determine from an increased packet loss rate, and a nominal jitter value, that a broken fiber fault is present within the IP based communications system.

Preferably, a control plane monitoring and/or a voice plane monitoring of the IP traffic is performed by the traffic analyzer 14.

Advantageously, the fault determiner 141 moreover determines if the MOS, determined by the parameter determiner 140 is at least 4.0, as required by the standard ED136 Chapter 6.3.1.

Fourth Embodiment

Figure 4:
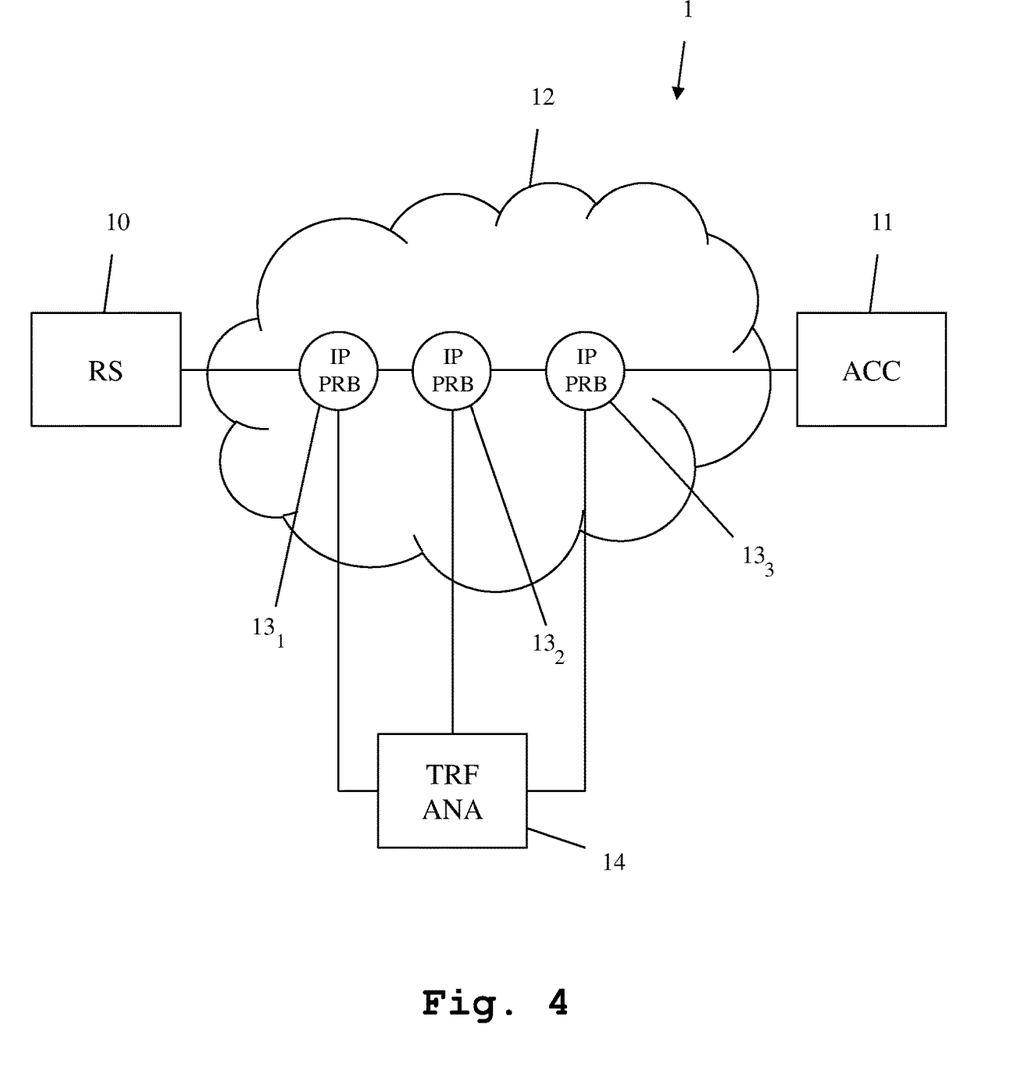
FIG. 4 shows a fourth embodiment of the first aspect of the invention.

In FIG. 4, a fourth embodiment of the voice quality measuring system according to the first aspect of the invention, is shown. Here, the IP based communications system 12 comprises separate IP probes $13_1$, $13_2$, $13_3$ within the IP based communications system 12.

Each of the IP probes $13_1$, $13_2$, $13_3$ monitors a different link of the communications connection. This means that a first communications link is monitored by the IP probe $13_1$, a second communications link is monitored by the IP probe $13_2$, and a third communications link is monitored by the IP probe $13_3$. By monitoring the IP traffic at the individual communications links, the functioning of the individual communications links can be determined.

The monitored traffic is then passed on to the traffic analyzer 14. The traffic analyzer 14 then analyzes the IP traffic of all connected IP probes $13_1$-$13_3$. This is especially beneficial for determining the location of a fault within the IP based communications system 12.

Fifth Embodiment

Figure 5:
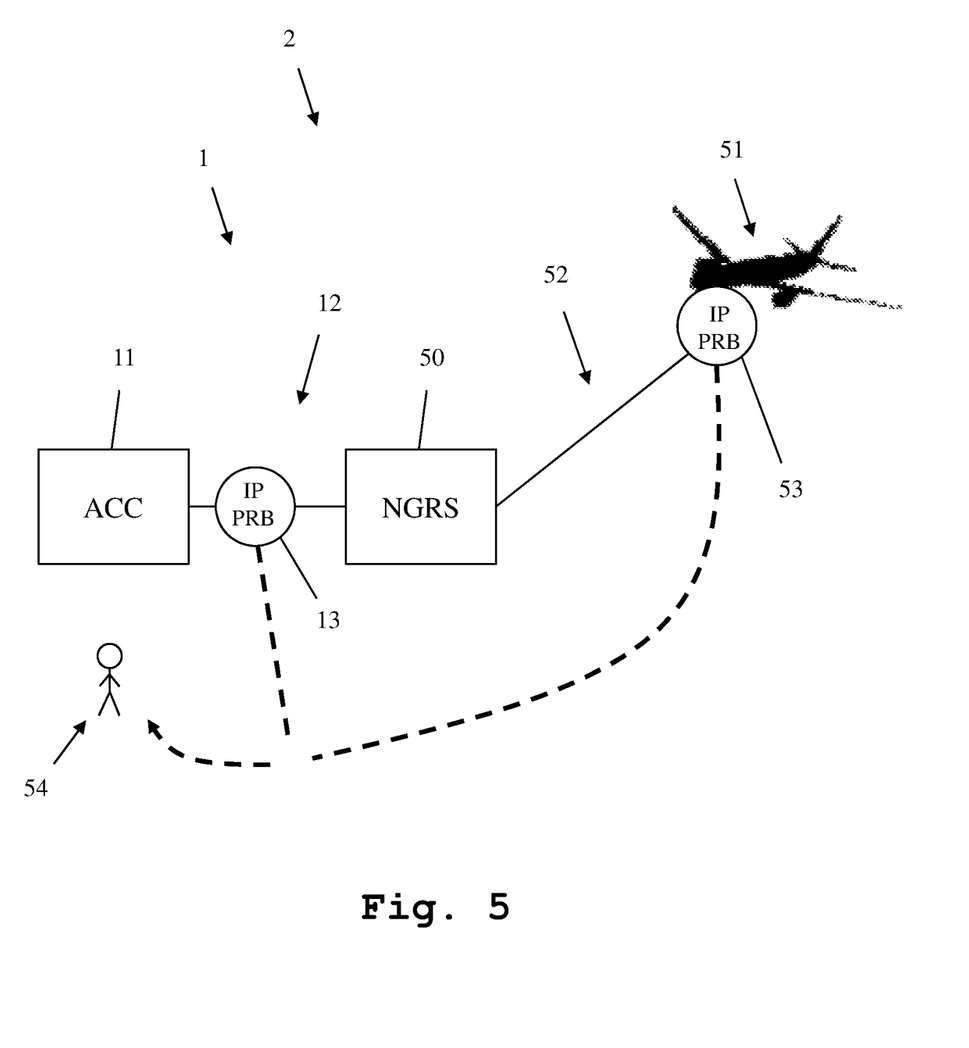
FIG. 5 shows a fifth embodiment of the first aspect of the invention.

In FIG. 5, a fifth embodiment of the invention is shown. Especially, here a communications system 2, comprising a voice quality measuring system 1 and an airplane 51 is shown. The voice quality measuring system 1 comprises an air traffic control center, ACC, 11 connected to a radio site, especially a next generation radio site 50 through a non-depicted IP based communications system. The IP based communications system comprises an IP probe 13, which monitors IP traffic between the next generation radio site 50 and the ACC 11. With regard to the function of the voice quality measuring system 1, it is referred to the earlier elaborations along FIG. 1-FIG. 4.

Furthermore, the next generation radio site 50 and the airplane 51 are connected through a further IP based communications system 52. A further IP probe 53, which is preferably part of the further IP based communications system 52, and which is preferably located on board of the airplane 51 is adapted to monitor IP traffic between the next generation radio site 50 and the airplane 51 through the further IP based communications system 52.

Results of the monitoring of the IP traffic between the ACC 11 and the NGRS 50 are reported by the IP probe 13 to a user 54, located for example at the ACC 11. Results of the monitoring of the IP based traffic between the NGRS 50 and the airplane 51 by the IP probe 53 are advantageously also reported to the user 54.

Advantageously, the results of the IP traffic monitoring by the IP probe 13 and/or the IP probe 53 are both handed to a traffic analyzer, as shown and described along FIG. 2-3. An according analysis of the IP traffic can then be performed. Especially, a parameter determiner of the traffic analyzer can determine a quality parameter of the IP based traffic monitored by the IP probe 13 and the IP based traffic monitored by the IP probe 53. In case of the quality parameter of either or both of these IP traffics being below a pre-set or adjustable quality threshold, the communications system 2 is adapted to communicate this to the user 54.

Alternatively or additionally, an automatic switch from an IP based communication to a legacy amplitude modulation based communication is possible. Especially, it is possible to switch to AM based communications as soon as at least one of the IP based communications has a quality below the quality threshold. Alternatively, it is possible to switch only the communications link with the low communications quality to AM based communications.

For example, if the quality parameter of the IP traffic monitored by the IP probe 13 is above the quality threshold and the quality parameter of the IP traffic monitored by the IP probe 53 is below the quality threshold, the communication between the NGRS 50 and the airplane 51 can be switched from the IP based communications system 52 to an AM based communications system, which is not depicted here.

Sixth Embodiment

Figure 6:
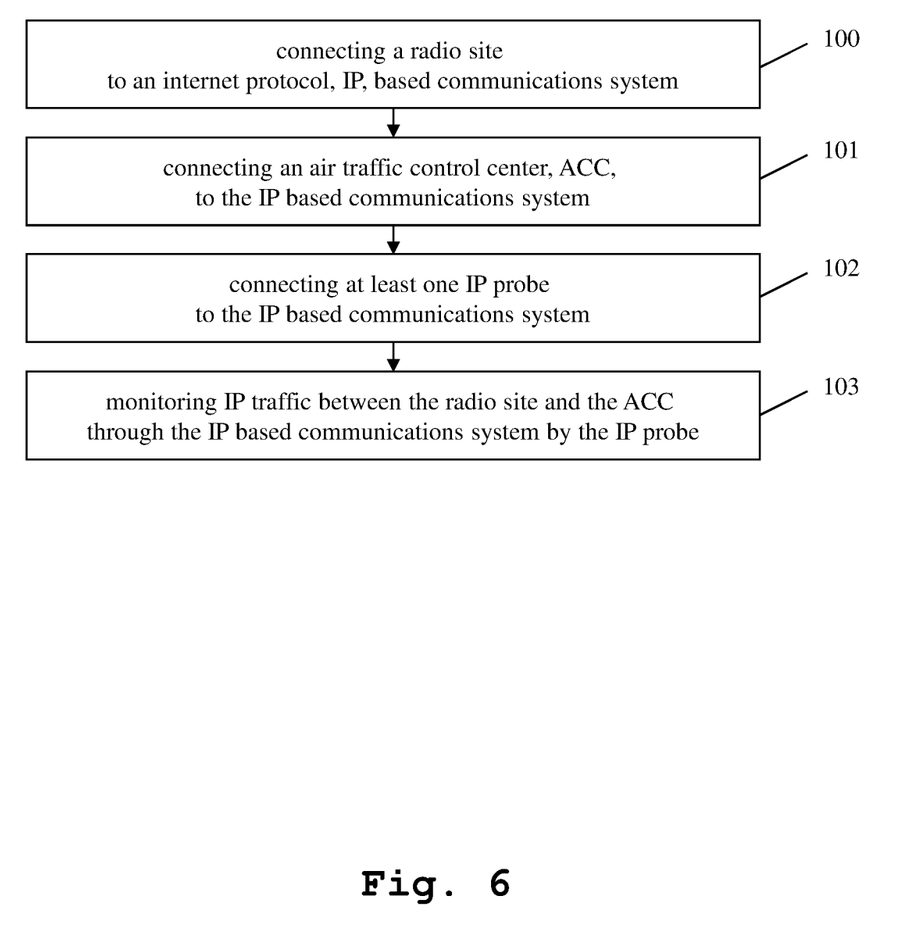
FIG. 6 shows an embodiment of the second aspect of the invention.

In FIG. 6, an embodiment of the voice quality measuring method according to the second aspect of the invention is shown in a flow diagram.

In a first step 100, a radio site is connected to an IP based communications system. In a second step 101, an ACC is connected to the IP based communications system. In a third step 102, at least one IP probe is connected to the IP based communications system. In a final step 103, IP traffic between the radio site and the ACC through the IP based communications system is monitored by the IP probe.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor.

The memory unit may be located inside or outside the processor and can communicate date with the processor through a variety of known means.

The invention is not limited to the examples and especially not to a specific number of communications links or IP based communications devices. Also, the invention can be applied in communications systems with more than two participants. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A voice quality measuring system, comprising:
a radio site,
an air traffic control center (ACC),
an airplane,
a first internet protocol (IP), based communications system, connecting the radio site and the ACC,
a first IP probe,
a second IP based communications system, connecting the radio site and the airplane, and a second IP probe,
wherein the radio site is a next generation radio site (NGRS), wherein the second IP probe is configured to monitor IP traffic between the radio site and the airplane through the second IP based communications system, and wherein the first IP probe is configured to monitor IP traffic between the radio site and the ACC through the first IP based communications system.

2. The voice quality measuring system according to claim 1, wherein the radio site is located in a control tower, and wherein the radio site comprises at least one radio.

3. The voice quality measuring system according to claim 1, wherein the ACC comprises at least one air traffic control (ATC) working place.

4. The voice quality measuring system according to claim 1, wherein the first probe is located within the first IP based communications system or at one point of the first IP based communications system.

5. The voice quality measuring system according to claim 1, wherein the first IP based communications system comprises at least one air traffic navigation service provider wide area network (ANSP WAN) connection.

6. The voice quality measuring system according to claim 5, wherein the first IP probe is configured to monitor IP traffic over the at least one ANSP WAN connection.

7. The voice quality measuring system according to claim 1, wherein the first IP based communications system comprises a plurality of interlinked communications devices, and wherein the first and second IP probes are configured to monitor IP traffic at one of the plurality of the interlinked communications devices of the first IP based communications system and second IP based communications system, respectively.

8. The voice quality measuring system according to claim 1, comprising a traffic analyzer, configured to analyze the IP traffic monitored by the first and second IP probes.

9. The voice quality measuring system according to claim 8, wherein the traffic analyzer comprises a parameter determiner, configured to determine at least one parameter of the IP traffic monitored by the first and second IP probes.

10. The voice quality measuring system according to claim 9, wherein the parameter determiner is configured to determine the at least one parameter in time slices of a predetermined time duration.

11. The voice quality measuring system according to claim 10, wherein the parameter determiner is configured to determine:

a mean opinion score (MOS) based on the monitored IP traffic, and/or
a jitter value,
a round trip delay time,
a packet arrival time histogram,
a packet loss rate,
a burst loss rate,
a loss density, or
a transport policy.

12. The voice quality measuring system according to claim 11, wherein the traffic analyzer comprises a fault determiner, configured to automatically determine faults of the first IP based communications system or of the radio site or of the ACC, based upon the at least one parameter of the IP traffic determined by the parameter determiner.

13. The voice quality measuring system according to claim 12, wherein the fault determiner is configured to automatically determine the faults of the first IP based communications system based upon detecting pre-defined patterns of the at least one parameter of the IP traffic determined by the parameter determiner.

14. The voice quality measuring system according to claim 13, wherein the parameter determiner is configured to determine a packet loss rate and a jitter value, and wherein the fault determiner is configured to automatically determine a broken fiber fault of the first IP based communications system based upon detecting an increased packet loss rate and a nominal jitter value.

15. The voice quality measuring system according to claim 1, wherein the second IP probe is located on the airplane.

16. A voice quality measuring method, comprising the steps of:

connecting a next generation radio site (NGRS) to a first internet protocol (IP) based communications system,
connecting an air traffic control center (ACC) to the first IP based communications system,
connecting a first IP probe to the first IP based communications system,
monitoring IP traffic between the NGRS and the ACC through the first IP based communications system by the first IP probe,
connecting a second IP based communications system to the NGRS and an airplane,
by way of the second IP based probe, monitoring IP traffic between the NGRS and the airplane through the second IP based communications system.

* * * * *